United States Patent
Farley et al.

(10) Patent No.: US 11,229,163 B2
(45) Date of Patent: Jan. 25, 2022

(54) HARVESTER REEL ANTI-WRAP BAFFLE

(71) Applicant: CNH Industrial America LLC, New Holland, PA (US)

(72) Inventors: Herbert M Farley, Elizabethtown, PA (US); Barry E. Lehman, York, PA (US)

(73) Assignee: CNH Industrial America LLC, New Holland, PA (US)

( * ) Notice: Subject to any disclaimer, the term of this patent is extended or adjusted under 35 U.S.C. 154(b) by 177 days.

(21) Appl. No.: 16/480,807

(22) PCT Filed: Jan. 25, 2018

(86) PCT No.: PCT/US2018/014994
§ 371 (c)(1),
(2) Date: Jul. 25, 2019

(87) PCT Pub. No.: WO2018/140459
PCT Pub. Date: Aug. 2, 2018

(65) Prior Publication Data
US 2019/0387679 A1 Dec. 26, 2019

Related U.S. Application Data

(60) Provisional application No. 62/450,353, filed on Jan. 25, 2017.

(51) Int. Cl.
| | |
|---|---|
| *A01D 57/03* | (2006.01) |
| *A01D 41/14* | (2006.01) |
| *A01D 57/12* | (2006.01) |
| *A01D 57/02* | (2006.01) |
| *A01D 43/06* | (2006.01) |
| *A01D 61/00* | (2006.01) |

(52) U.S. Cl.
CPC ............. *A01D 57/03* (2013.01); *A01D 41/14* (2013.01); *A01D 57/12* (2013.01); *A01D 43/06* (2013.01); *A01D 57/02* (2013.01); *A01D 61/002* (2013.01)

(58) Field of Classification Search
CPC ........ A01D 57/03; A01D 41/14; A01D 57/12; A01D 57/02; A01D 43/06; A01D 61/002
See application file for complete search history.

(56) References Cited

U.S. PATENT DOCUMENTS

| | | | |
|---|---|---|---|
| 4,199,927 A | 4/1980 | Craig et al. | |
| 4,472,928 A | 9/1984 | Easton | |
| 4,833,869 A | 5/1989 | Klein | |
| 5,359,839 A * | 11/1994 | Parsons | A01D 57/03 460/122 |
| 5,595,053 A * | 1/1997 | Jasper | A01D 57/02 56/226 |

(Continued)

OTHER PUBLICATIONS

International Search Report and Written Opinion for Application No. PCT/US2018/014994 dated Apr. 5, 2018 (11 pages).

*Primary Examiner* — Arpad Fabian-Kovacs
(74) *Attorney, Agent, or Firm* — Peter Zacharias; Patrick Sheldrake

(57) ABSTRACT

A reel assembly (200) for a header of a combine harvester is provided. The reel is guided by a cam assembly (300). A baffle (408) is provided to the reel assembly (200) and incorporated into the cam assembly (300) to deflect crop material away from the cam assembly.

20 Claims, 5 Drawing Sheets

(56) References Cited

U.S. PATENT DOCUMENTS

| | | | |
|---|---|---|---|
| 6,591,598 B2* | 7/2003 | Remillard | A01D 57/03 |
| | | | 56/221 |
| 6,843,045 B2* | 1/2005 | Bickel | A01D 57/03 |
| | | | 56/14.4 |
| 7,131,253 B2* | 11/2006 | Remillard | A01D 57/02 |
| | | | 56/14.4 |
| 7,146,790 B2 | 12/2006 | Duquesne et al. | |
| 7,665,287 B2* | 2/2010 | Jones | A01D 57/03 |
| | | | 56/364 |
| 8,590,284 B2 | 11/2013 | Rayfield | |
| 9,414,544 B2 | 8/2016 | Babler et al. | |
| 9,526,209 B2* | 12/2016 | Honey | A01D 57/02 |
| 9,622,413 B2* | 4/2017 | Neely | A01D 63/04 |
| 2006/0201126 A1 | 9/2006 | Remillard et al. | |
| 2012/0304611 A1 | 12/2012 | Rayfield | |
| 2015/0272003 A1* | 10/2015 | Honey | A01D 57/025 |
| | | | 56/181 |
| 2017/0059027 A1* | 3/2017 | Jasper | F16H 53/06 |
| 2018/0242525 A1* | 8/2018 | Schwinn | A01D 57/02 |
| 2019/0082601 A1* | 3/2019 | Honey | A01D 57/04 |
| 2020/0178464 A1* | 6/2020 | Talbot | A01D 57/03 |
| 2020/0178466 A1* | 6/2020 | Remillard | A01D 57/12 |
| 2020/0256437 A1* | 8/2020 | Lehman | A01D 57/03 |

* cited by examiner

HARVESTER REEL ANTI-WRAP BAFFLE

FIELD OF THE INVENTION

The present invention relates generally to a baffle for use with a harvesting reel of agricultural harvesters. In particular, a plurality of baffles are provided about lateral ends of reel support members so as to deflect crop material, e.g., grain and material other than grain ("MOG") from collecting about a cam track of the harvesting reel.

BACKGROUND OF THE INVENTION

Harvesting reels, such as a pickup reel, a draper reel and a gathering reel, are used on agricultural machines to guide the crop to a cutting means as well as, if necessary, a feeding shaft. The reel is supported by a supporting shaft in the center of the reel, the longitudinal axis thereof forming the rotational axis of the reel. The reel includes a plurality of tine rods or bars extending transversely to the direction of travel with protruding tines for engaging the crop. The tine bars rotate with the supporting shaft of the reel. Individual tines are connected to the tine bars and extend generally outwardly and/or downwardly to engage crop material. A cam track guides motion of the tine bars so as to optimize the path of the tines.

During use, some crop and/or other crop material does not get guided into the agricultural machine but instead the crop collects at lateral ends of the reel. At the lateral ends of the tine bars, about the cam track, loose crop can inadvertently collect and wrap around the cam track while the reel rotates. As a result, there is poor crop handling at the lateral ends of the reel due to wrapping of crop material around the cam track and cam followers that guide the tine bars.

BRIEF SUMMARY OF THE INVENTION

In accordance with an exemplary embodiment of the present invention, there is provided a harvesting reel for an agricultural harvester that includes a frame and a reel assembly. The reel assembly has a central rotating shaft, a plurality of support members, and a cam assembly. The plurality of support members extend widthwise across the reel assembly and are connected to the central rotating shaft for rotation therewith. The cam assembly is for guiding movement of the support members and includes a cam track, a cam follower, and a baffle. The cam track is connected to the reel assembly. Preferably, the cam track is connected to a lateral end of the reel assembly. The cam follower is connected to one of the plurality of support members and engaging the cam track. The baffle is proximate the cam follower for deflecting crop material.

In accordance with another exemplary embodiment of the present invention, there is provided a reel assembly for an agricultural harvester including a central rotating shaft, a plurality of support members, a guide assembly, and a plurality of follower assemblies. The plurality of support members extend widthwise across the reel assembly and are connected to the central rotating shaft for rotation therewith. The guide assembly is connected to one of plurality of support members. At least one follower assembly guides movement of the support members. Each of the plurality of follower assemblies includes a follower for engaging the guide assembly and a baffle for deflecting crop material.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments, which are presently preferred. It should be understood, however, that the invention is not limited to the precise arrangements and instrumentalities shown.

In the drawings.

DETAILED DESCRIPTION OF THE INVENTION

Figure 1:
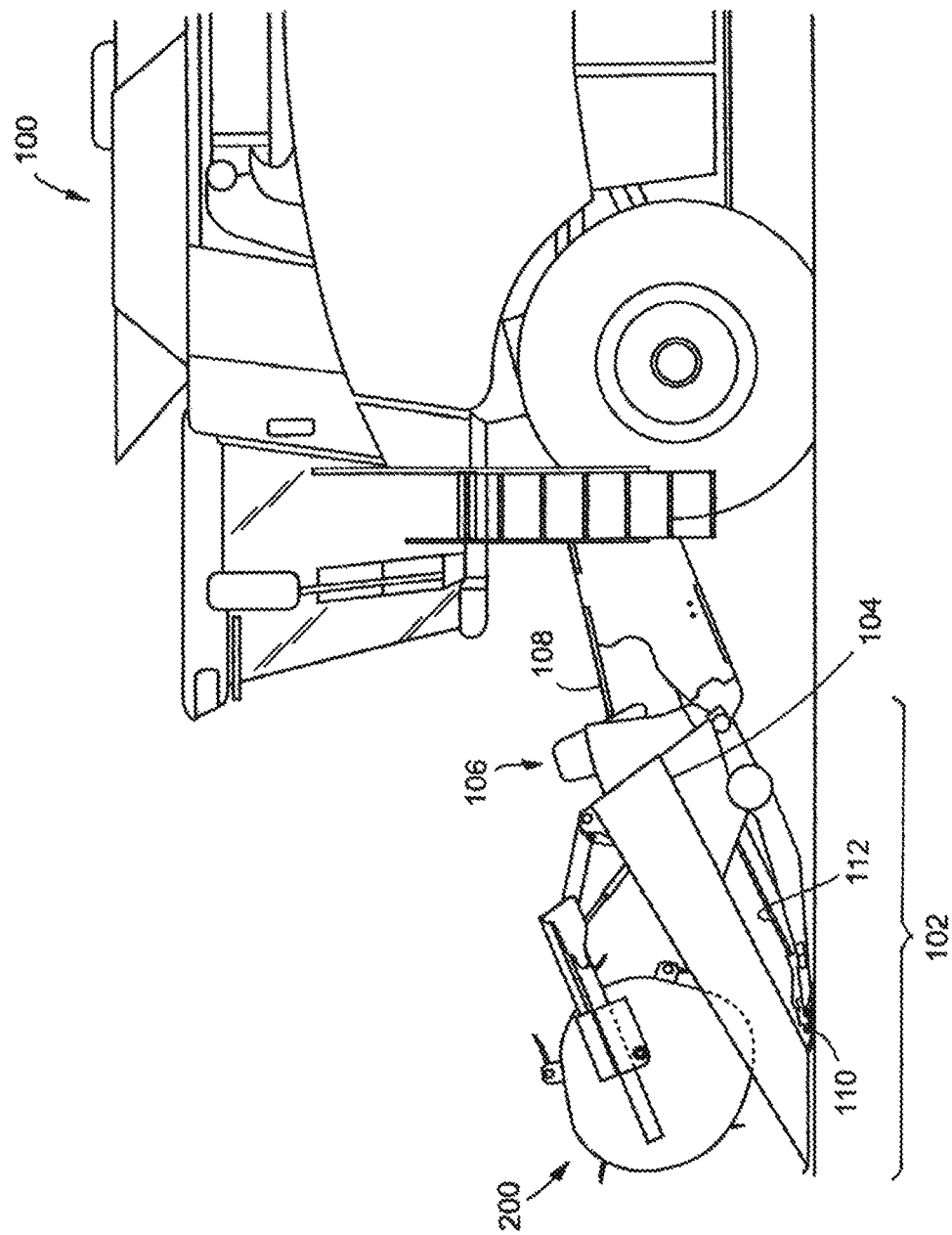
FIG. 1 is a side view of a harvester in accordance with an exemplary embodiment of the present invention.

Reference will now be made in detail to the various aspects of the present invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the present invention in any manner not explicitly set forth.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the identified element and designated parts thereof. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

The terms "corn," "ear," "stalk," "leaf," and "crop material" are used throughout the specification for convenience and it should be understood that these terms are not intended to be limiting. Thus, "corn" or "grain" refers to that part of a crop which is harvested and separated from discardable portions of the crop material. The header of the present invention is applicable to a variety of crops, including but not limited to wheat, soybeans and small grains. The terms "debris," "material other than grain," and the like are used interchangeably.

Throughout this disclosure, various aspects of the present invention can be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the embodiments of the present invention may be combined in any suitable manner in one or more embodiments. One skilled in the relevant art will recognize, in light of the description herein, that the present invention can be practiced without one or more of the specific features or advantages of a particular embodiment. In other instances, additional features and advantages may be recognized in certain embodiments that may not be present in all embodiments of the present invention.

Referring now to the drawings wherein exemplary embodiments of the present invention are shown, FIG. 1 illustrates an agricultural harvester 100 in accordance with an exemplary embodiment of the present invention. The agricultural harvester e.g., a combine harvester 100, includes a header 102 having a chassis or frame 104 which is attached to a forward end 106 of the harvester, more specifically to a feederhouse 108. The header 102 is configured to cut crops with a cutting apparatus 110 as the harvester 100 moves forward over a crop field, and includes a reel assembly 200 and a draper belt 112 for moving crop materials rearwardly, feeding the crop material to the harvester 100 through the feederhouse 108.

Figure 2:
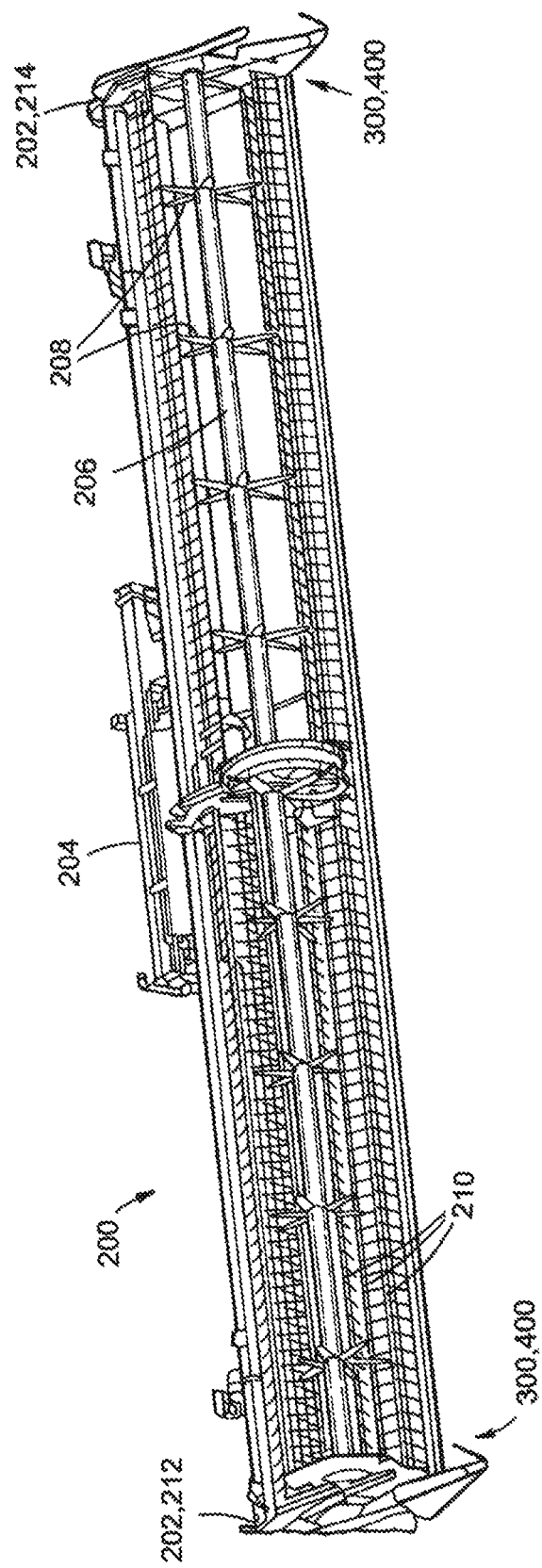
FIG. 2 is a front perspective view of a reel assembly of the harvester of FIG. 1 in accordance with an exemplary embodiment of the present invention.

As best shown in FIGS. 1 and 2, the reel assembly 200 spans laterally and widthwise from the header 102. The reel assembly 200 includes a mounting assembly 202 for mounting to a frame 204 of the header 102 or for mounting directly to the header.

The reel assembly 200 includes a central rotating shaft or axle 206 supporting spokes 208 with support members or tine bars 210A-F (FIG. 3A) mounted to distal portions of the spokes. The central rotating shaft 206 is powered by the header 102 to drive operations of the reel.

Figure 3A:
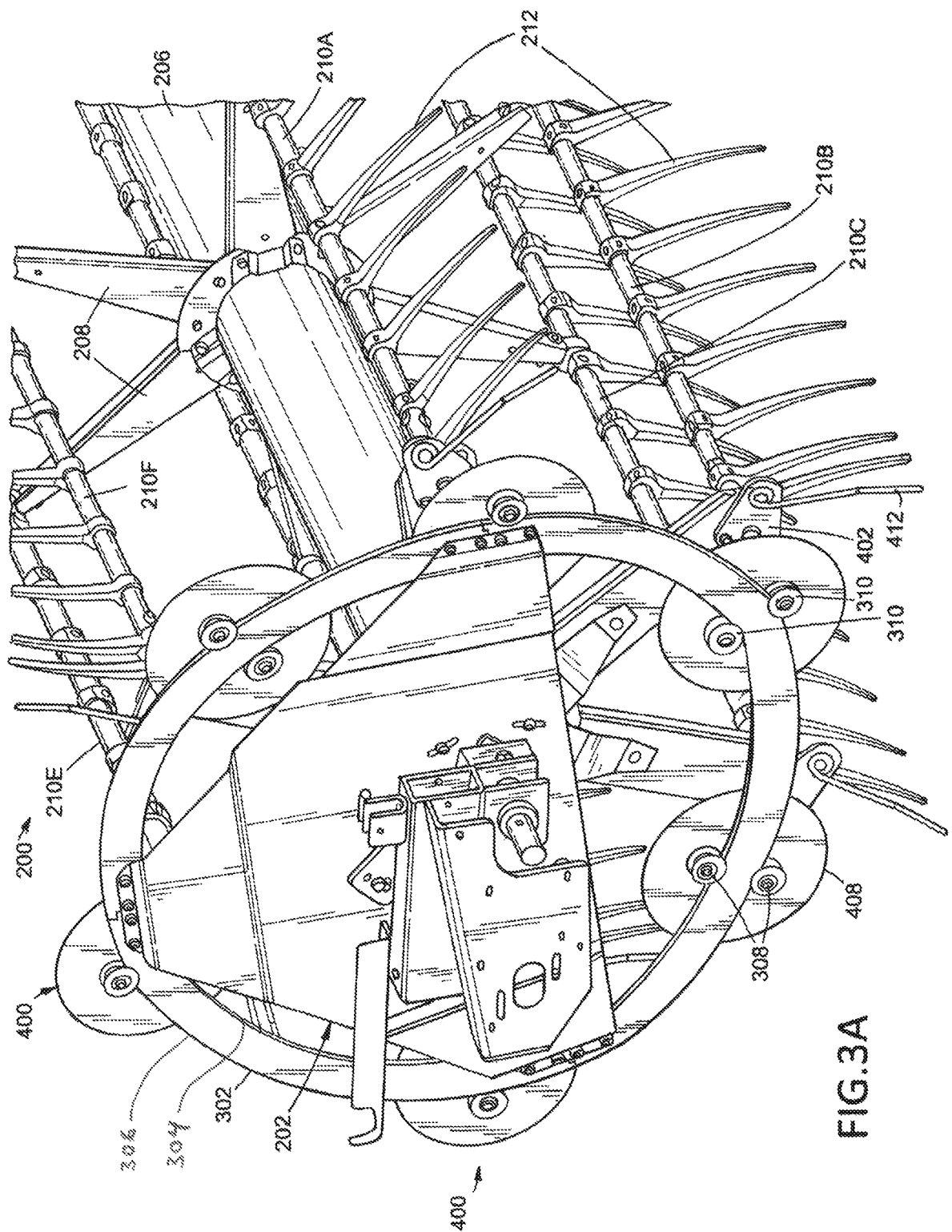
FIG. 3A is a perspective view of a cam assembly of the reel assembly of FIG. 2 in accordance with an exemplary embodiment of the present invention.

As shown in FIGS. 2 and 3A, the support members 210A-F extend radially from the central rotating shaft 206 and are circumferentially spaced about the central rotating shaft. The exemplary reel assembly 200 of the present invention is illustrated with six support members 210A-F, however more or fewer are contemplated.

Each support member or rod 210A-F includes a plurality of tines 212 for gathering and directing crop downwardly and rearwardly into the header 102 for subsequent cutting and harvesting operations.

The reel assembly 200 also has lateral ends 212, 214 that each include a mounting assembly 202 for attaching the reel assembly to the header 102. The lateral ends 212, 214 of the reel assembly 200 also include a cam assembly 300 and a follower subassembly 400, as further described below. The reel assembly can alternatively include cam assemblies about other locations besides its lateral sides. In other words, the cam assembly is connected to the reel assembly.

Figure 3B:
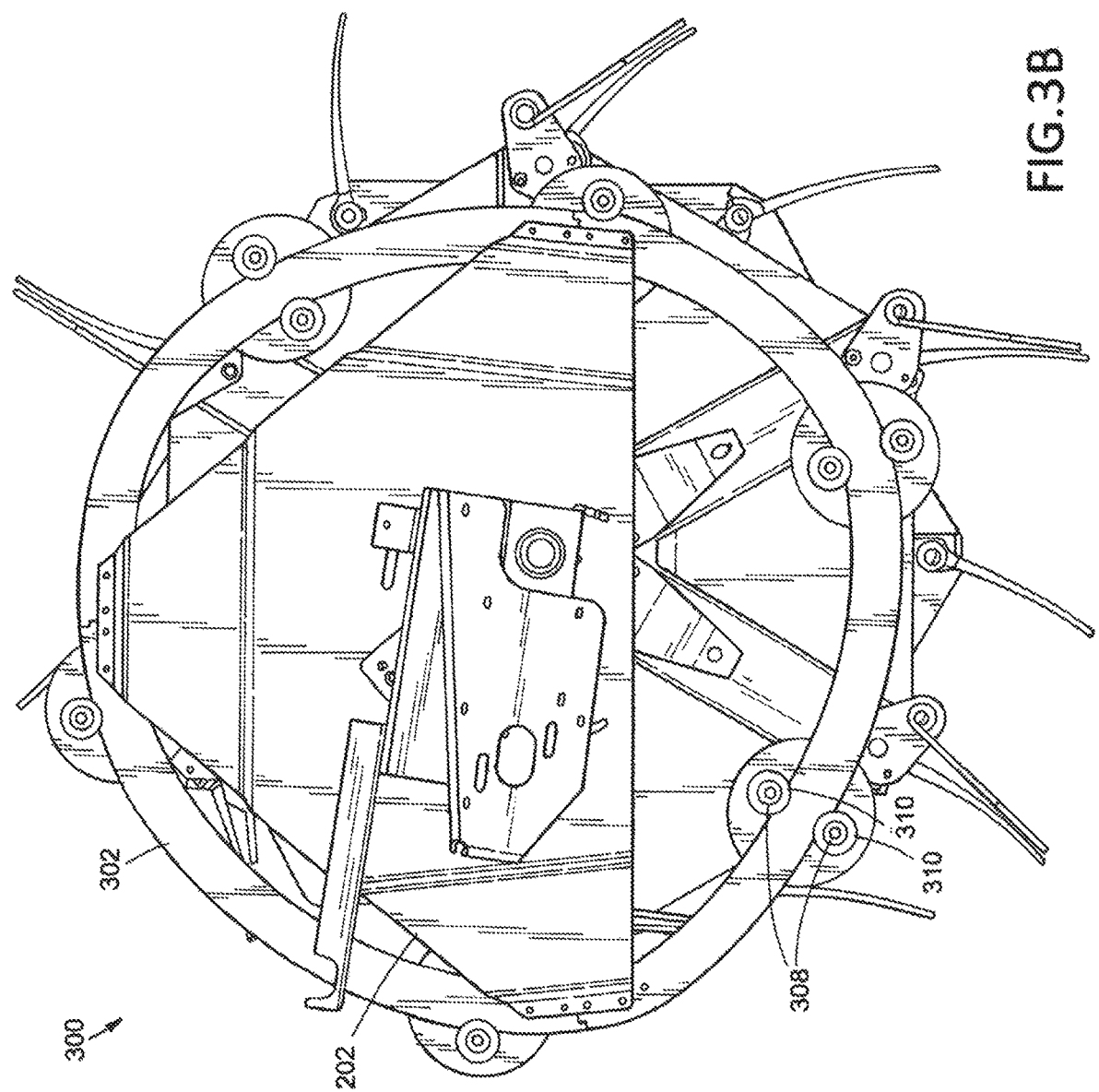
FIG. 3B is a side elevation view of the cam assembly of FIG. 3A.

Referring now to FIGS. 3A and 3B, the cam assembly or guide assembly 300 of the reel assembly 200 is illustrated. The cam assembly 300 includes a cam track 302, also referred to as a guide, that is fixedly attached to the mounting assembly 202. The cam track 302 is generally circular and may be formed of multiple parts or integrally formed. The cam track 302 has an inner surface 304 and an outer surface 306, and is connected to the reel assembly. Preferably, the cam track is connected to a lateral end of the reel assembly. In particular, the cam assembly is connected to one of the plurality of support members.

A plurality of cam followers 308 are spaced about the cam track 302 for engaging the cam track. In the preferred embodiment, each of the cam followers 308 is a pair of roller bearings 310. The roller bearings 310 are positioned to engage the inner surface 304 and the outer surface 306 of the cam track 302.

Figure 4:
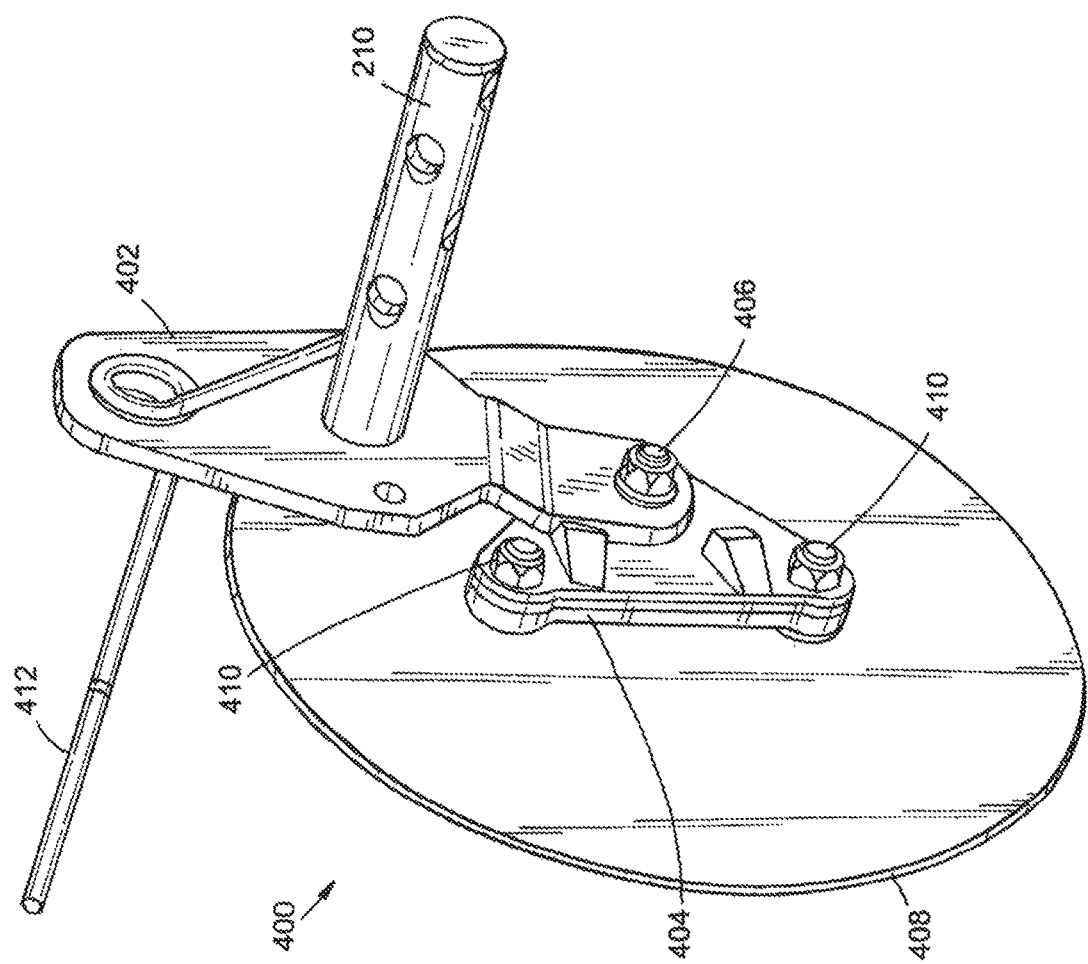
FIG. 4 is a partial perspective view of a follower subassembly of the cam assembly of FIG. 3A.

FIG. 4 shows in detail the follower assembly 400. A crank plate 402 is rigidly mounted on the support member 210 at a lateral distal end 212 or 214 of the support member. A bracket 404 is mounted to the crank plate 402 via a pivot joint 406. A baffle 408 is fixedly mounted to the bracket 404 by a plurality of connectors 410. The connectors 410 extend through the baffle 408 to rotatably support the cam followers 308. The follower assembly guides movement of the support member, and the follower engages the guide assembly.

The crank plate 402 also includes a finger 412 that functions similarly to tines 212 in guiding crop toward harvesting operations. The finger 412 may be resilient and may be mounted to the crank plate 402 with a torsional spring base, so as to accommodate forces experienced during use.

The baffle 408 is illustrated as a substantially flat circular disc or plate, but may be provided as a convex or concave disc, or a non-circular shaped disc, e.g., a star shaped disc, a sickle-shaped disc and the like. Such non-circular shaped discs would further facilitate shredding of crop material about the cam assembly. The baffle can optionally be configured to include sharpened edges to facilitate the cutting and shredding of crop material and MOG, e.g., to prevent wrapping of such crop material about the cam assembly parts.

The baffle can alternatively be pivotably connected to the cam assembly. For example, the baffle can be configured to rotate or pivot relative to the cam follower.

The baffle 408 is positioned between the cam follower 308 and a respective one of the plurality of support members 210A-F. Alternatively, the baffle can be positioned about a lateral side of both the cam follower and a respective one of the plurality of supper members. Further, the cam assembly can alternatively be configured to include a pair of baffles about the lateral sides of the cam follower such that the cam follower is between the pair of baffles.

The baffle 408 is sized to span and overlap the bearings 310 that constitute the cam follower 308, so as to prevent crop material from collecting around and between the cam follower 308 and the cam track 302. To this end, a diameter or width of the baffle 408 may be about two or three times greater than a span length between the bearings 310. Preferably, the overall diameter of the baffle is sized to be at least about an overall diameter defined by centers of a pair of cam followers 308, and no larger than a diameter such that an outer edge remains within a space defined by an outer end of a tine on the support member. In a configuration with only a single cam follower, the overall diameter of the baffles is sized to be at least slightly greater, e.g., 10% greater than an overall diameter of the single cam follower.

During use, the pivotal connection between the crank plate 402 and the bracket 404 allows the cam follower subassembly 400 to accommodate the shape of the cam track 302. The central rotating shaft 206 is powered via the header 102 to rotate, causing the support members 210A-F to revolve around the shaft, while the cam assembly 300 and follower subassembly 400 guide the path of the support members.

The baffle 408 provides two modes for preventing crop accumulation. First, the baffle 408 is positioned inboard of the cam track 302 and cam follower 308, so as to prevent crop from passing outward from the support members 210A-F and tines 212. Second, the baffle 408 is sized to overlap and extend beyond the cam track 302 and cam follower 308, therefore deflecting crop that is in the path of the reel assembly 200 rotation or in the path of forward motion of the harvester.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject application as defined by the appended claims.

We claim:

1. A harvesting reel for an agricultural harvester comprising:
   a frame; and
   a reel assembly including:
      a central rotating shaft,
      a plurality of support members extending widthwise across the reel assembly and connected to the central rotating shaft for rotation therewith, and
      a cam assembly for guiding movement of the support members, the cam assembly having:
         a cam track having an inner circumferential surface and an outer circumferential surface and connected to the reel assembly,
         a pair of cam followers connected to one of the plurality of support members, one of each of the pair of cam followers respectively engaging the inner circumferential surface and the outer circumferential surface of the cam track, and
         a baffle proximate the pair of cam followers for deflecting crop material, wherein the baffle spans and overlaps the pair of cam followers.

2. The harvesting reel of claim 1, wherein the baffle is positioned between the pair of cam followers and one of the plurality of support members.

3. The harvesting reel of claim 1, wherein a central portion of the baffle is rigidly connected to the pair of cam followers.

4. The harvesting reel of claim 1, wherein the baffle is a disk.

5. The harvesting reel of claim 1, wherein the cam assembly further includes a finger for gathering crop.

6. The harvesting reel of claim 1, wherein the cam assembly further includes a crank plate rigidly connected to a support arm and pivotably connected to the pair of cam followers.

7. The harvesting reel of claim 6, wherein the crank plate has a finger for gathering crop.

8. The harvesting reel of claim 6, wherein the cam assembly further includes a bracket for mounting both the cam follower and the baffle to one of the plurality of support arms.

9. The harvesting reel of claim 8, wherein the bracket is rigidly mounted to the baffle, the bracket pivotably supports the pair of cam followers, and the bracket is pivotably connected to the crank plate.

10. The harvesting reel of claim 1, wherein the pair of cam followers is rotatably mounted to the baffle.

11. The harvesting reel of claim 1, wherein the pair of cam followers includes a pair of bearings.

12. The harvesting reel of claim 1, wherein the pair of cam followers includes a first cam follower and a second cam follower radially spaced from the first cam follower.

13. The harvesting reel of claim 1, wherein the cam track is positioned between the pair of cam followers.

14. A reel assembly for an agricultural harvester comprising:
   a central rotating shaft;
   a plurality of support members extending widthwise across the reel assembly and connected to the central rotating shaft for rotation therewith;
   a guide assembly having an inner circumferential track and an outer circumferential track, and connected to one of the plurality of support members; and
   at least one follower assembly for guiding movement of the support members, each follower assembly including:
      a pair of followers for engaging the inner circumferential track and the outer circumferential track of the guide assembly, and
      a baffle that spans and overlaps the pair of followers.

15. The reel assembly of claim 14, wherein each follower assembly further includes a crank plate rigidly connected to one of the plurality of support members and pivotably connected to the pair of followers.

16. The reel assembly of claim 15, wherein the plurality of support members include a plurality of tines for gathering crop, and wherein the crank plate has a finger for gathering crop.

17. The reel assembly of claim 14, wherein a width of the baffle is about two to three times a span length between the pair of followers.

18. The reel assembly of claim 14, wherein an overall diameter of the baffle is sized to be greater than an overall diameter defined by centers of the pair of cam followers.

19. The reel assembly of claim 14, wherein the pair of followers includes a first follower and a second follower radially spaced from the first follower.

20. The reel assembly of claim 14, wherein the guide assembly is positioned between the pair of followers.

* * * * *